United States Patent
Pasley, Sr.

[15] 3,690,292
[45] Sept. 12, 1972

[54] APPARATUS FOR FABRICATING HIGHLY RESILIENT POLYVINYL CHLORIDE LAYERS AND THE LIKE

[72] Inventor: Robert H. Pasley, Sr., Coral Gables, Fla.

[73] Assignee: Royalty Designs of Florida, Inc., Hialeah, Fla.

[22] Filed: Aug. 3, 1970

[21] Appl. No.: 60,380

[52] U.S. Cl. .................................. 118/59, 118/415
[51] Int. Cl. ............................................. B05c 3/18
[58] Field of Search........118/59, 302, 325, 415, 410, 118/600

[56] References Cited
UNITED STATES PATENTS

| | | |
|---|---|---|
| 542,701 | 7/1895 | Badgley ................... 118/59 X |
| 1,667,408 | 4/1928 | Allen ...................... 118/415 X |
| 2,754,228 | 7/1956 | Bede ....................... 118/600 X |
| 2,841,827 | 7/1958 | Crownover ......... 118/415 UX |
| 2,955,955 | 10/1960 | Orr ........................ 118/415 X |

Primary Examiner—John P. McIntosh
Attorney—Rines and Rines

[57] ABSTRACT

Apparatus for applying plastic material to carrier sheets. Pump means are provided for moving the plastic material from a reservoir through a tubular heat exchanger to a coating station bounded by doctor blade means. The carrier sheet passes over a coating table and beneath the doctor blade means to a wind up means.

4 Claims, 1 Drawing Figure

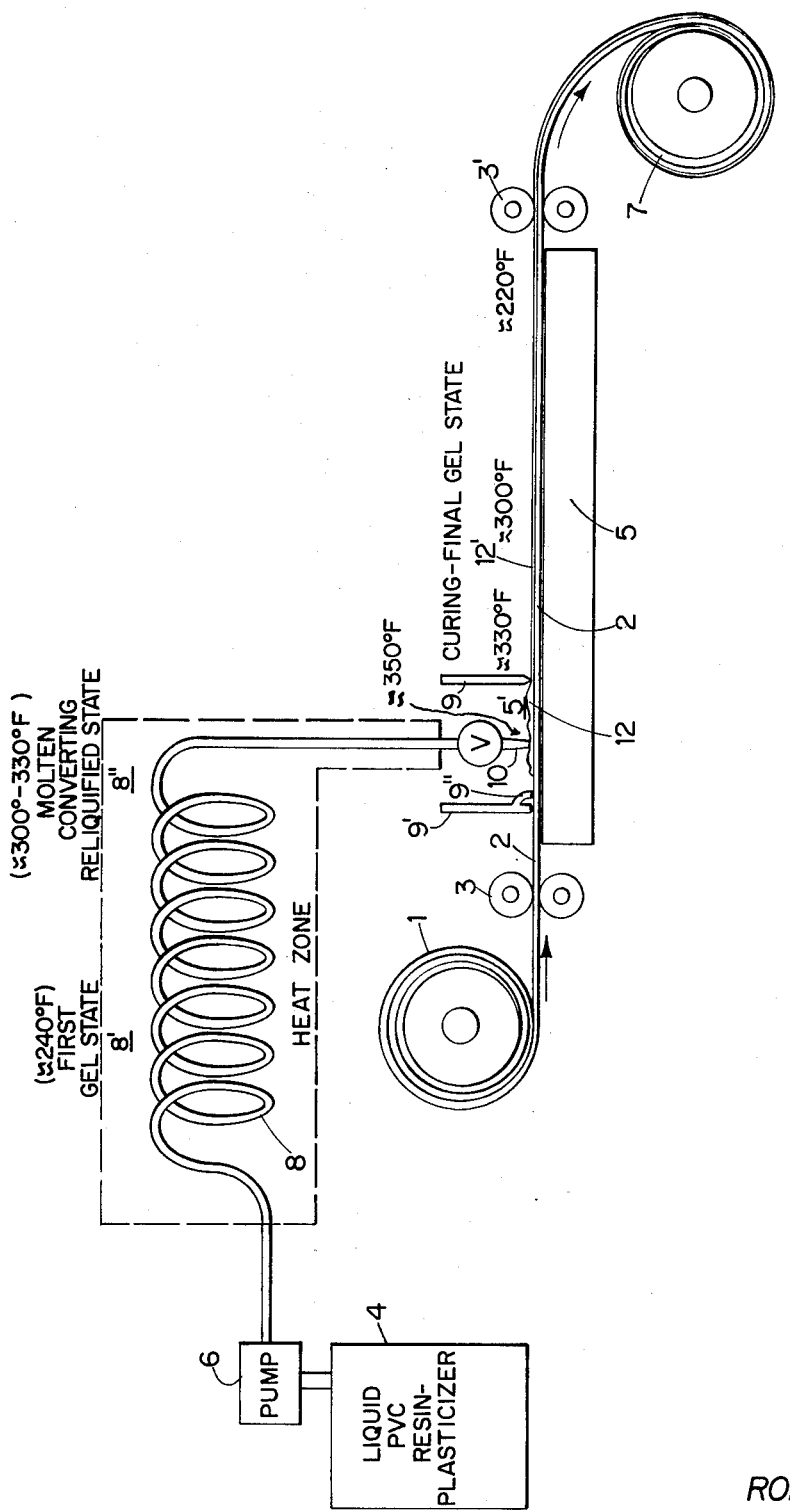

APPARATUS FOR FABRICATING HIGHLY RESILIENT POLYVINYL CHLORIDE LAYERS AND THE LIKE

The present invention relates to apparatus for fabricating highly resilient layers of polyvinyl chloride and the like, being more specifically directed to producing the same as a secured layer to a carrier.

In copending application, Ser. No. 625,214, filed Mar. 22, 1967, for "Fabric Carried Plastic Article and Process for Forming the Same,", now abandoned in favor of a continuation application, Ser. No. 64,000, filed June 19, 1970, there is disclosed an unusually highly plasticized polyvinyl chloride composition involving plasticizer-to-polyvinyl chloride resin ratios of at least substantially 400 parts-to-100 parts and higher, useful for such purposes as decorating fabrics to which the plastic is adhered or in which or in which it is at least partially molded, or providing other resilient coatings or layers that stretch, compress and otherwise deform in a unitary manner with a wide range of attached fabrics or the like. Preferred ratios from about 400 to about 600 parts of plasticizer per 100 parts of pvc resin, wherein there is minimal plasticizer oil-exudation, are therein described; but high ratios can enable cushioning or non-bottoming results to be obtained with the quivery mass, and, in the region of 1,200 parts-to-100 parts or more, useful oil-exudation or self-lubricating properties, as well. Sound, vibration and temperature insulation and isolation can also be obtained.

There are occasions, however, where the configuration and/or the large dimensions of the required quivery plastic practically forbid the molded attachment process in cavities or other ovens disclosed in said application.

In fact, with other types of plastics, it has been conventional to apply layers to fabrics and other carrier sheets, such as for chair coverings and rug backings and the like, by placing the unfused plastic upon the fabric in an oven, bringing the oven temperature up to fusion, and then cooling. Embossing or other decoration is usually applied after the jelling.

The requirements for sizable ovens and for heating the fabric or other carrier together with the plastic-to-be-attached, however, are not only disadvantageous, particularly for large-size sheets and the like, but even restrict the kind of fabrics and other carriers that can be used.

It is to the solution of these and other problems more particularly connected with quivery polyvinyl chloride plastic, including deletereous color and other characteristic changes occurring when particular non-heat-stable plasticizers are subjected to prolonged static high temperature conditions, that the present invention is primarily directed; it being an object of the invention to provide a new and improved apparatus for producing and attaching highly resilient quivery plastic layers of both large and small dimensions to a wide variety of fabrics and other carriers, that obviate the need for ovens and molds and the subjecting of the carriers to molding temperatures.

A further object is to provide a novel apparatus for plastic fabrication of more general utility, as well. In summary, however, in one important aspect, the invention contemplates the flowing of a liquefied mixture of plastic resin and plasticizer (preferably polyvinyl chloride resin) along narrow flow paths, heating the mixture as it flows along the flow paths sufficiently to convert the same and render it in molten state, ejecting the molten converted plastic upon a carrier sheet so as to be at least partially absorbed thereby and contacted therewith as a result of at least partial penetration of the hot molten plastic, doctoring the molten plastic upon the carrier, and moving the carrier along a substantially laminar path to effect gradual cooling and curing of the plastic upon and to the carrier. Preferred details, constructions and formulations are hereinafter set forth.

The invention will now be described with reference to the accompanying drawing the single FIGURE of which is a schematic block and flow diagram illustrating the invention in preferred form.

Referring to the drawing, a roll of carrier sheet material is shown at 1 dispensing the carrier layer 2 through drive rolls 3 and 3' over a coating table 5 to a roll-up station 7. The carrier may comprise porous layers, fabrics of a wide variety of types ranging from thin loosely woven cloth to unwoven mattes, paper and thick canvas or other sheets or tightly woven materials, and other openings-provided or absorbing materials, as well.

While other plastics may be used, for illustrative purposes and in view of particular special characteristics of the same desired for the preferred purposes of the invention, the description will proceed with the example of quivery highly plasticized polyvinyl chloride coatings or layers for adhering to the carrier 2. A reservoir 4 contains a liquefied mixture of the plastic resin and plasticizers, such as the before-mentioned polyvinyl chloride resin (Geon 121, for example) and plasticizers including phthyalate and fireproofing phosphate plasticizers, preferably in at least about 400–500 parts-to-100 parts ratio with the resin, as before discussed. With the phosphate plasticizer (such as Monsanto types 140 and 148) at least 50 percent of the plasticizer mix, and preferably about 60 percent, and with the balance substantially of phthyalate plasticizer (such as Monsanto type 912), a highly plasticized and resilient quivery plastic coating can be attained that has been found to resist burning despite the unusually high content of plasticizer, even on exposure to 1,300° F flames. Such a plastic-coated carrier, particularly with fireproof carrier material, is eminently suited to such purposes as roofing and the like.

In accordance with the invention, the liquefied resin-plasticizer mixture is moved, as by pumping action at 6, from the reservoir 4 into a heating chamber or zone, so-labelled, containing limited area flow paths, illustrated as of narrow spiral loop tubing 8. For the above example, the zone will be maintained at a temperature of about 350°–400° F by conventional means, in order to enable the mixture to reach a first gel temperature of about 240° F at the flow path region or part 8'. It then continues to move to the hotter region or part 8" at which it becomes converted into a molten reliquefied state (at about 300°–330° F), being finally ejected, through any desired valve control V, at a nozzle outlet 10, at a temperature of about 350° F.

The outlet 10 is disposed at a station 5' of the coating table 5, bounded by doctor blades 9 and 9', which may themselves be heated to prevent adhesion, and the latter of which may be provided with a resilient bottom flap 9'' to prevent the exuding rearward of the hot molten plastic 12 received at station 5' upon the carrier sheet 2 passing therethrough.

It has been found that by proper selection of ejection temperature of the converted molten plastic 12, in the light of the particular weave or absorbing characteristics of the selected carrier 2, the degree of penetration of the hot molten plastic into the room temperature or other relatively cool carrier 2 in the region 5' can be controlled in any desired amount, ranging from minimal penetration to substantially complete penetration. With "duck" type canvas, for example, a few millimeters penetration is readily obtained within a few seconds for 350° F molten pvc formulated as above described; so that such absorbing and contacting with the molten plastic 12 is assured in the time that the carrier 2 is passing through the receiving station 5'.

The setting of the doctor blade 9 will determine the thickness of the plastic coating 12' extending in relief on top of the carrier 2, and this may range from a minimal coating to coatings thicker than the carrier itself, if desired. For the roofing applications, before mentioned, for example, a thickness of about one-sixteenth of an inch, more or less, is satisfactory. By carrying the plastic-coated carrier 2–12' along the coating table 5 beyond the station 5' in substantially laminar fashion, the plastic has been found gradually and most uniformly to cool to successively lower temperatures (schematically illustrated at successive regions 330°F, 300°F, 200°F) simultaneously uniformly curing the plastic into its final quivery solid state, securely locked and bonded to the carrier.

Thus the prior art requirement for large ovens and for subjecting the carrier to high plastic converting temperatures therein, as well as the other disadvantages previously discussed, have been admirably overcome. Even the heating zone or chamber is adaptable to minimal size by the coiling of the flow path tubing 8 either as shown, or in a flat spiral, or in other space-saving configurations. The dynamic limited area flow paths provided by the use of the tubing 8 and nozzle 10, or other limited channel construction, moreover, prevents static high temperature conditions that would otherwise cause heat-unstable plasticizer, such as the phosphate plasticizer, to effect deleterious color changes and other characteristic changes in the plastic.

Further modifications will occur to those skilled in the art and all such are considered to all within the spirit and scope of the invention as set forth in the appended claims.

What is claimed is:

1. Apparatus for fabricating plastic layers and attaching the same to carrier layers, the apparatus having, in combination, a reservoir of liquefied mixture of plastic resin and plasticizer, a heating chamber comprising limited area flow paths, means for moving the mixture from the reservoir into and through the said flow paths, said heating chamber having means for heating said mixture to a temperature sufficient to convert the plastic during its movement through said flow paths, the said flow paths being provided with outlet means through which the converted plastic may be ejected in a molten state, and a coating table provided with means for moving therealong a carrier sheet that is at least partially to absorb and bond to the plastic and having a plastic-receiving station bounded by doctor blade means, the station being disposed to receive the said outlet means in order that the converted molten plastic ejected thereby may impinge upon the carrier so as to be at least partially absorbed thereby and contacted therewith as a result of the at least partial penetration of the hot molten plastic as the carrier moves through said station, the coating table having a curing section extending sufficiently beyond the said station and remote from said heating means to provide for the gradual substantially laminar cooling and curing of the plastic coating doctored upon the carrier.

2. Apparatus as claimed in claim 1 and in which the said paths include tubular loops.

3. Apparatus as claimed in claim 1 and in which the said plastic resin is polyvinyl chloride and the said liquefied mixture comprises at least about 400 parts of plasticizer to each 100 parts of the resin, the flow path heating means having means for bringing the liquefied mixture to about 240° F to produce a gel as it moves through a first part of the flow paths, and then to about 300°–330° F as the gel moves to a second part of the flow paths and for converting it into a molten reliquefied state which is ejected at the outlet means at about 350° F, with the successive portions of the table curing section being occupied by plastic-coated carrier of successively lower cooled temperatures at which the plastic bonds to the carrier and solidifies in a final quivery solid state.

4. Apparatus as claimed in claim 1 and in which there is disposed, at a region beyond the coating table curing section, means for rolling up the plastic-coated carrier.

* * * * *